US007470858B2

(12) United States Patent
McNutt et al.

(10) Patent No.: US 7,470,858 B2
(45) Date of Patent: Dec. 30, 2008

(54) COMMUNICATION WALL RECEPTACLE CAP RETAINING SYSTEM AND METHOD

(75) Inventors: Patrick S. McNutt, Carnation, WA (US); Phillip Phung, Kirkland, WA (US); Frank Chin-Hwan Kim, Woodinville, WA (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 273 days.

(21) Appl. No.: 11/428,271

(22) Filed: Jun. 30, 2006

(65) Prior Publication Data

US 2007/0012474 A1 Jan. 18, 2007

Related U.S. Application Data

(60) Provisional application No. 60/695,401, filed on Jun. 30, 2005.

(51) Int. Cl.
*H02G 3/14* (2006.01)

(52) U.S. Cl. ........................... 174/67; 174/66; 174/135; 220/241; 439/135; 439/137

(58) Field of Classification Search .................. 174/66, 174/67, 135, 55, 56, 57; 220/241, 242; 439/135, 439/136, 137, 147
See application file for complete search history.

(56) References Cited

U.S. PATENT DOCUMENTS

| | | | | | |
|---|---|---|---|---|---|
| 2,985,334 | A | * | 5/1961 | Slater | 220/242 |
| 3,288,910 | A | * | 11/1966 | Zerwes | 174/53 |
| 5,408,046 | A | * | 4/1995 | Vandeventer | 174/67 |
| 5,747,739 | A | * | 5/1998 | Moeller | 174/67 |

* cited by examiner

*Primary Examiner*—Dhiru R Patel
(74) *Attorney, Agent, or Firm*—Davis Wright Tremaine LLP; George C. Rondeau, Jr.; Heather M. Colburn

(57) ABSTRACT

To assist in searching, the following abstract includes a receptacle system used to keep a receptacle cap secure through use of an enhanced retaining strap with its associated wall plate when the receptacle cap is unscrewed. The enhanced retaining strap is a separate individual component and is separably coupled to the rest of the receptacle system so that if it is pulled with sufficient force, the strap will break free from the rest of the receptacle system before associated members such as gaskets are damaged or loosened.

14 Claims, 12 Drawing Sheets

COMMUNICATION WALL RECEPTACLE CAP RETAINING SYSTEM AND METHOD

CROSS REFERENCE TO RELATED APPLICATION

This application claims priority benefit of provisional application Ser. No. 60/695,401 filed Jun. 30, 2005.

BACKGROUND OF THE INVENTION

Communication wall receptacles generally have one or more jacks that receive first communication cables having plugs that couple into the jacks. The first communication cables are typically located within a first room. The communication wall receptacles are typically mounted on the room side of a wall using a wall plate. The wall plate is usually sealed to the wall using a gasket when the communication wall receptacle is used in an industrial setting where potential contaminants exist in the environment on the room side of the wall. The jacks of the communication wall receptacles are generally coupled to second communication cables located in an area bounded by the side of the wall opposite the room such as behind the wall or in an adjacent room. By their nature, the wall receptacles breach the wall to which they are mounted. At times this breach can be undesirable.

For instance, vapors, liquid and particulate matter from the room can penetrate behind the wall or into the adjacent room, or vice versa, through any space between the communication wall receptacle and the wall plate. This can degrade the electrical connections of the plugs and jacks within the communication wall receptacle. To prevent such undesirable penetration, a gasket can be used to provide a fluid tight seal between the communication wall receptacle and the wall plate. To protect against such penetration when the communication wall receptacle is not in use, a cap is used to cover the receptacle. When the receptacle is engaged by a cable in the room, the cap can be retained to the receptacle by a strap. Often, one end of the strap is formed integral with the gasket used between the communication wall receptacle and the wall plate, hence simultaneously serving to provide the desired seal between the communication wall receptacle and the wall plate, and also to conveniently attach the strap to the receptacle and thereby retain the receptacle cap. Unfortunately, accidents happen in which the strap portion of such an integrated gasket/strap is unintentionally pulled on with sufficient force to break the seal the gasket portion creates between the receptacle and the wall plate, and thereby allow undesirable penetration of vapors, liquid and particulate matter past the receptacle. If sufficient force is applied the seal may be permanently broken; even lesser forces may create momentary leakages which with time can have a very deleterious effect. Either way, the integrity of the communication wall receptacle is adversely impacted.

BRIEF DESCRIPTION OF THE SEVERAL VIEWS OF THE DRAWING(S)

DETAILED DESCRIPTION OF THE INVENTION

As will be discussed in greater detail herein, a receptacle system includes elements that keep a receptacle cap secure through use of an enhanced retaining strap with its associated wall plate when the receptacle cap has been unscrewed. The enhanced retaining strap is a separate individual component and is separably coupled to the receptacle so that if it is pulled with sufficient force the strap will break free from the rest of the receptacle system before associated elements such as gaskets are damaged or loosened.

Figure 1:
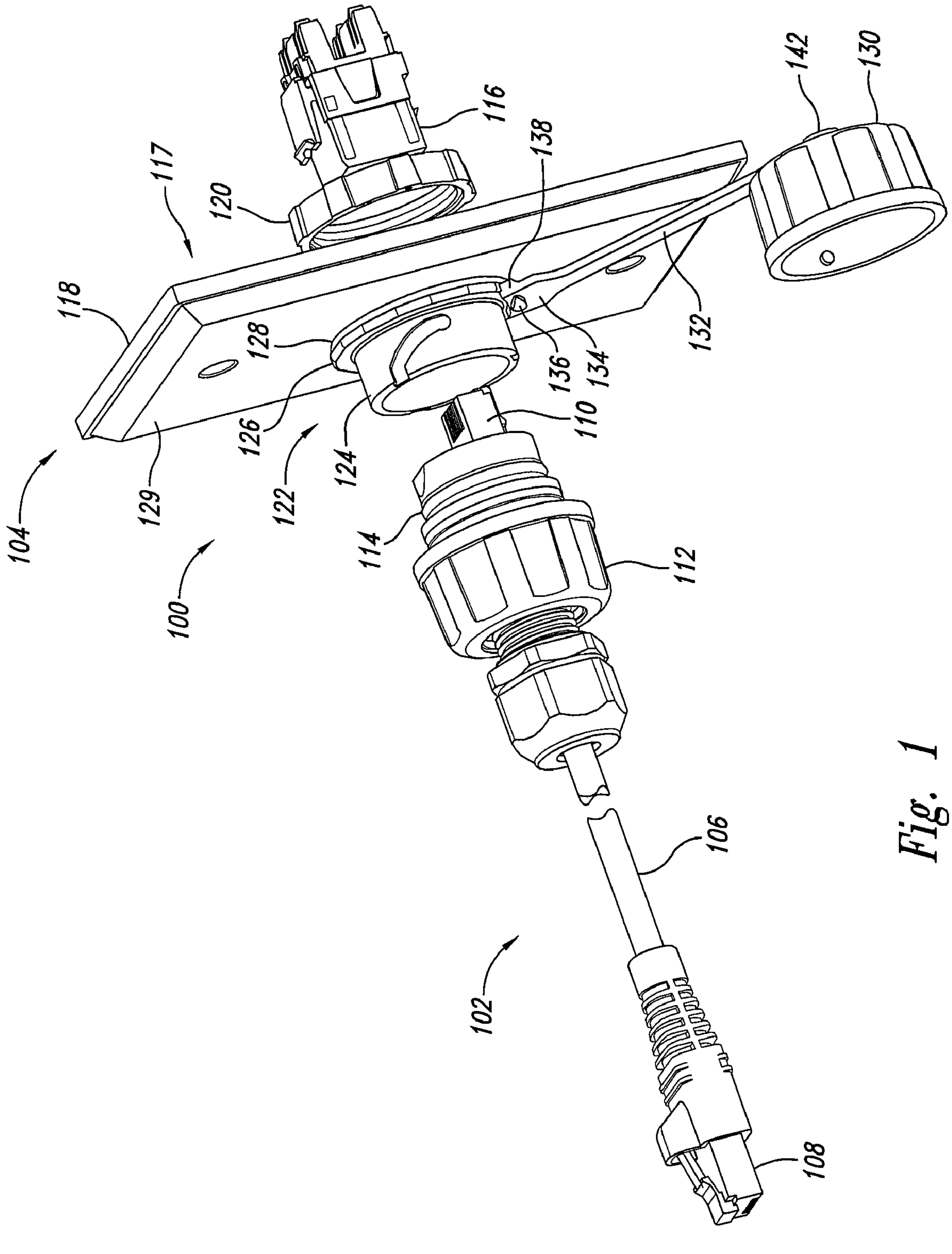
FIG. 1 is an exploded isometric front view of a receptacle system and an exemplary associated room cable.

A combined system 100 including a room cable 102 and a receptacle system 104 is shown in FIG. 1. The room cable 102 includes a cable 106 having a first end with a first plug 108 for coupling with a device or receptacle (not shown) and a second end with a second plug 110, a cable cap 112, and an insertion portion 114 for coupling with the receptacle system 104.

The receptacle system 104 includes a jack 116 coupled to a receptacle 122 mounted to a wall plate 118 from a behind wall side 117 of the wall plate. The receptacle 122 is attached to the wall plate 118 by positioning the receptacle in an aperture of the wall plate with a flange 126 of the receptacle to a room side surface 129 of the wall plate with a threaded rearwardly extending portion of the receptacle projecting rearwardly through the aperture to the behind the wall side 117 of the wall plate. A nut 120 located on the behind wall side 117 of the wall plate 118 is screwed onto the threaded rearwardly extending portion of the receptacle 122. A gasket 128 is positioned between the flange 126 and the room side surface 129 of the wall plate 118 to provide a fluid-tight seal between the receptacle 122 and the wall plate 118.

The jack 116 is positioned within an interior through passage of the receptacle 122 and is mechanically attached to the receptacle in a conventional manner using spring tabs. A cable (not shown) attached to the jack 116 would extend rearward from the jack. The receptacle 122 includes a room side engagement portion 124 through which the receptacle passage extends and within which the second plug 110 is positioned to engage with the jack 116. The engagement portion 124 further receives the insertion portion 114 within the receptacle passage and is configured so that the cable cap 112 can be removably screwed onto the engagement portion.

Figure 2:
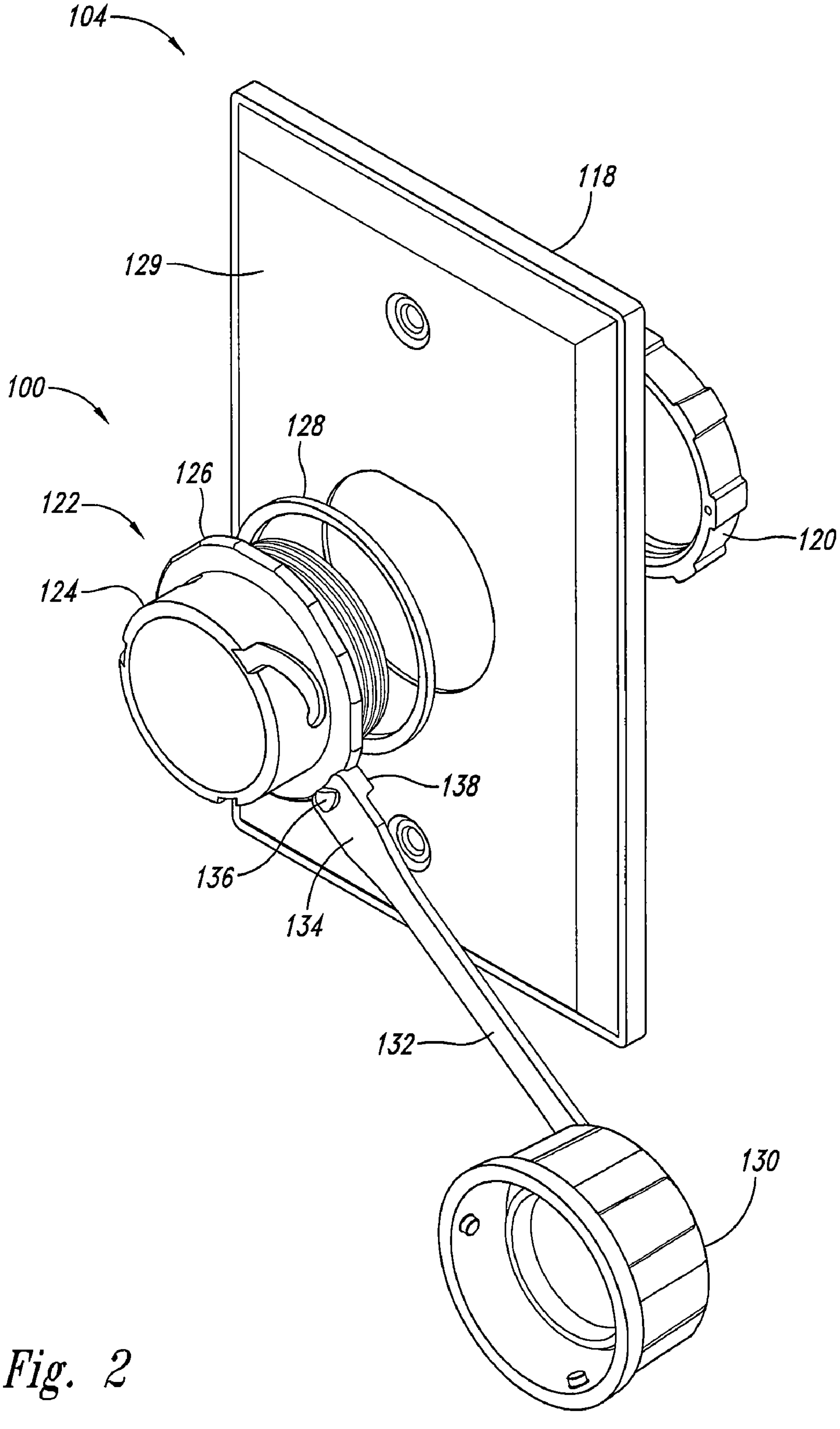
FIG. 2 is an enlarged, exploded isometric front view of the receptacle system of FIG. 1 without the cable and with a receptacle cap uncoupled from a room side component.
Figure 4:
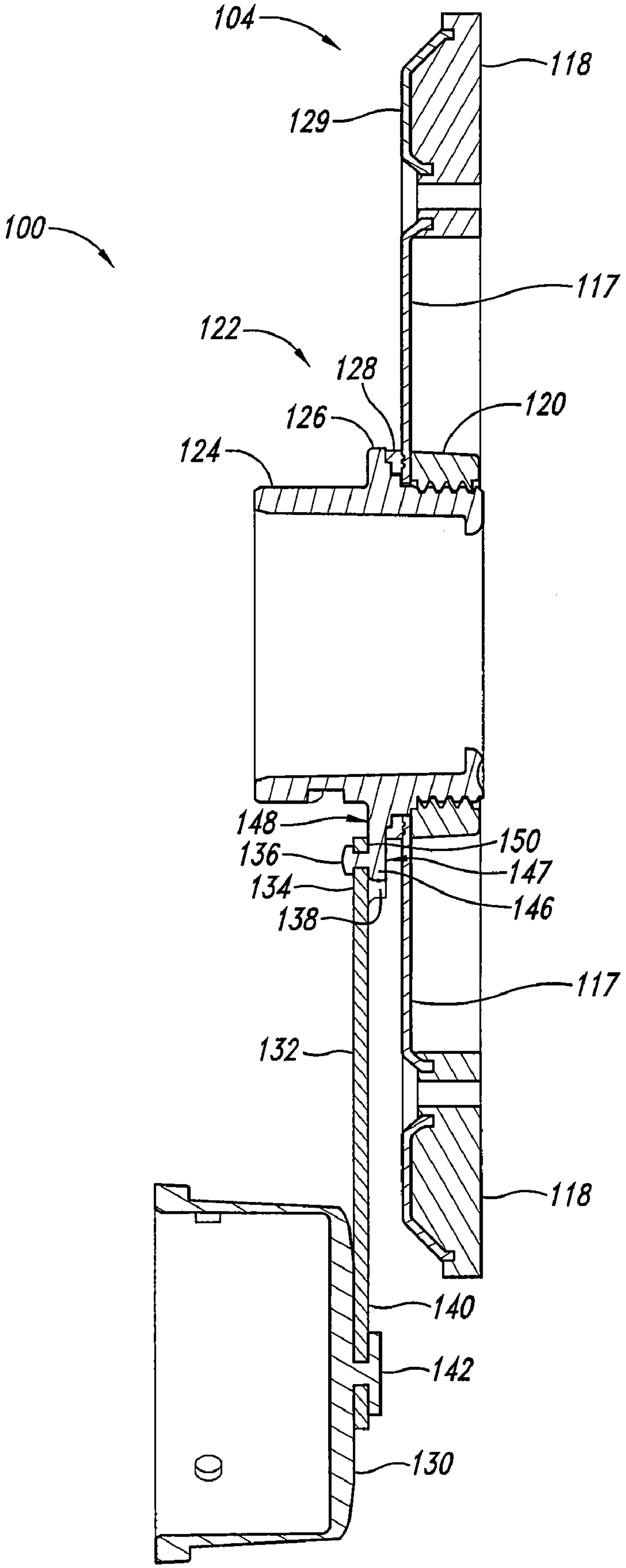
FIG. 4 is an enlarged cross-sectional side view of the receptacle system of FIG. 1.
Figure 5:
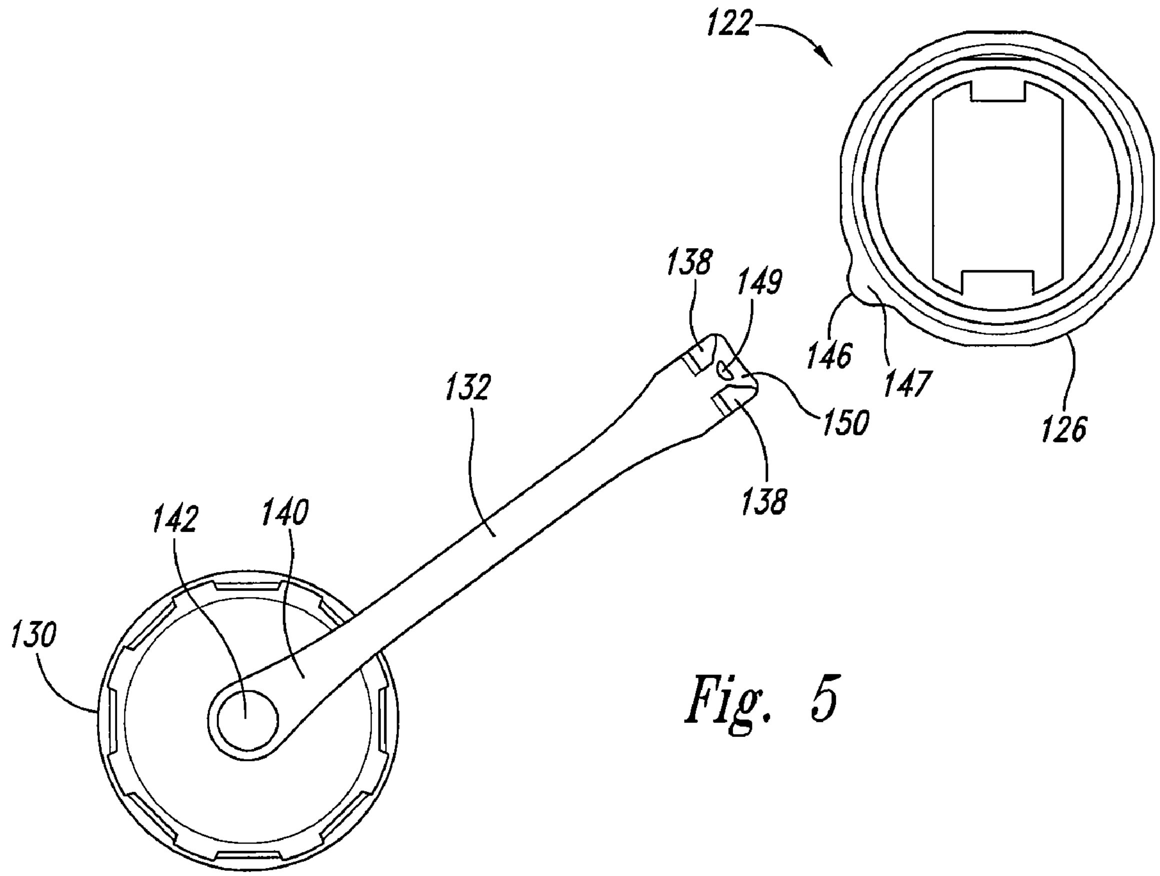
FIG. 5 is a rear view of the receptacle cap, a strap, and the room side component of the receptacle system of FIG. 1 with the strap unattached.

The receptacle system 104 includes a receptacle cap 130 that is retained by a strap 132. The strap 132 is coupled at a first end portion 134 to the flange 126 of the receptacle 122 and at a second end portion 140 to the receptacle cap 130, as further shown in FIG. 2. In the depicted implementation, the first end portion 134 of the strap 132 has an elongated aperture 149 through which a projecting member, peg or stud 136 projecting forward from the flange 126 of the receptacle 122 passes to secure the strap to the receptacle on the room side of the wall plate 118 (as best shown in FIG. 4). The strap 132 includes two projections 138 (as best shown in FIG. 5) that help keep the strap from rotating about the stud 136, as will be described below. In an alternative embodiment (not shown), the strap 132 may be formed integral with the receptacle 122 such as by over-molding or another suitable manufacturing process. The second end portion 140 of the strap 132 has a rounded aperture 151 through which a stud 142 of the receptacle cap 130 passes to secure the receptacle cap to the strap on the room side of the wall plate 118, as shown in FIG. 4.

Figure 3:
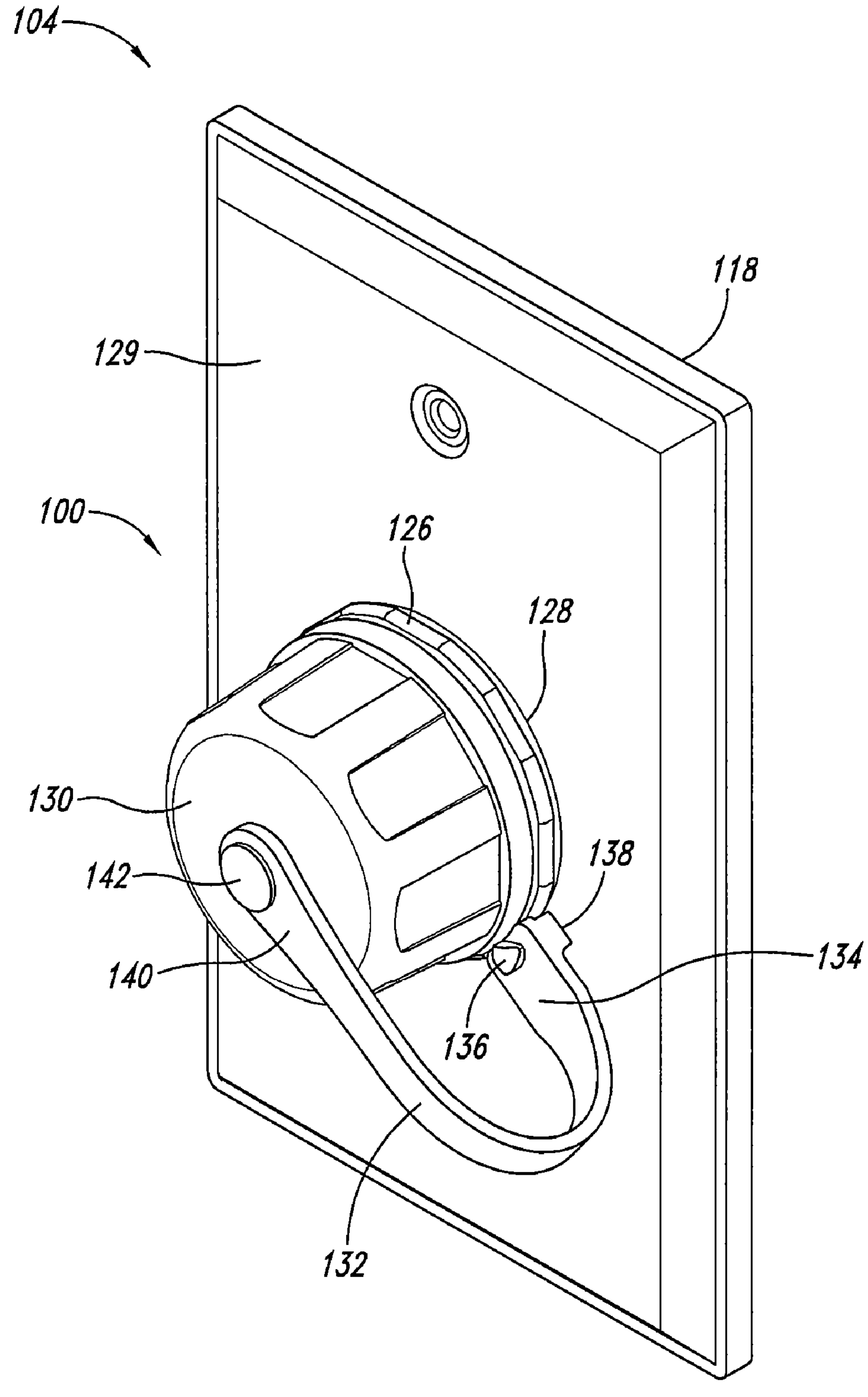
FIG. 3 is an isometric front view of the receptacle system of FIG. 2 with the receptacle cap coupled to the room side component.

The strap 132 is sufficiently flexible to be bent as needed to allow the receptacle cap 130 to be screwedly coupled to the engagement portion 124 when the room cable 102 is not coupled to the receptacle system 104, as shown in FIG. 3.

Figure 6:
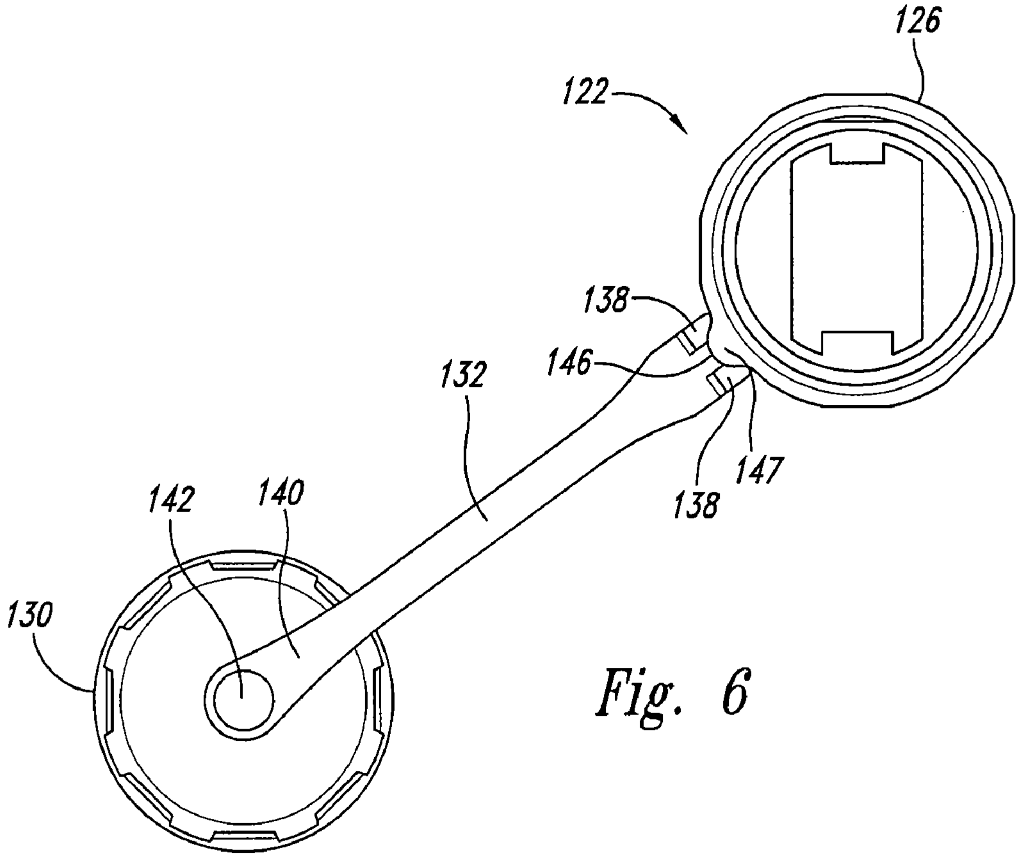
FIG. 6 is a rear view of the receptacle cap, the strap, and the room side component of the receptacle system of FIG. 1 with the strap attached to the room side component.
Figure 7:
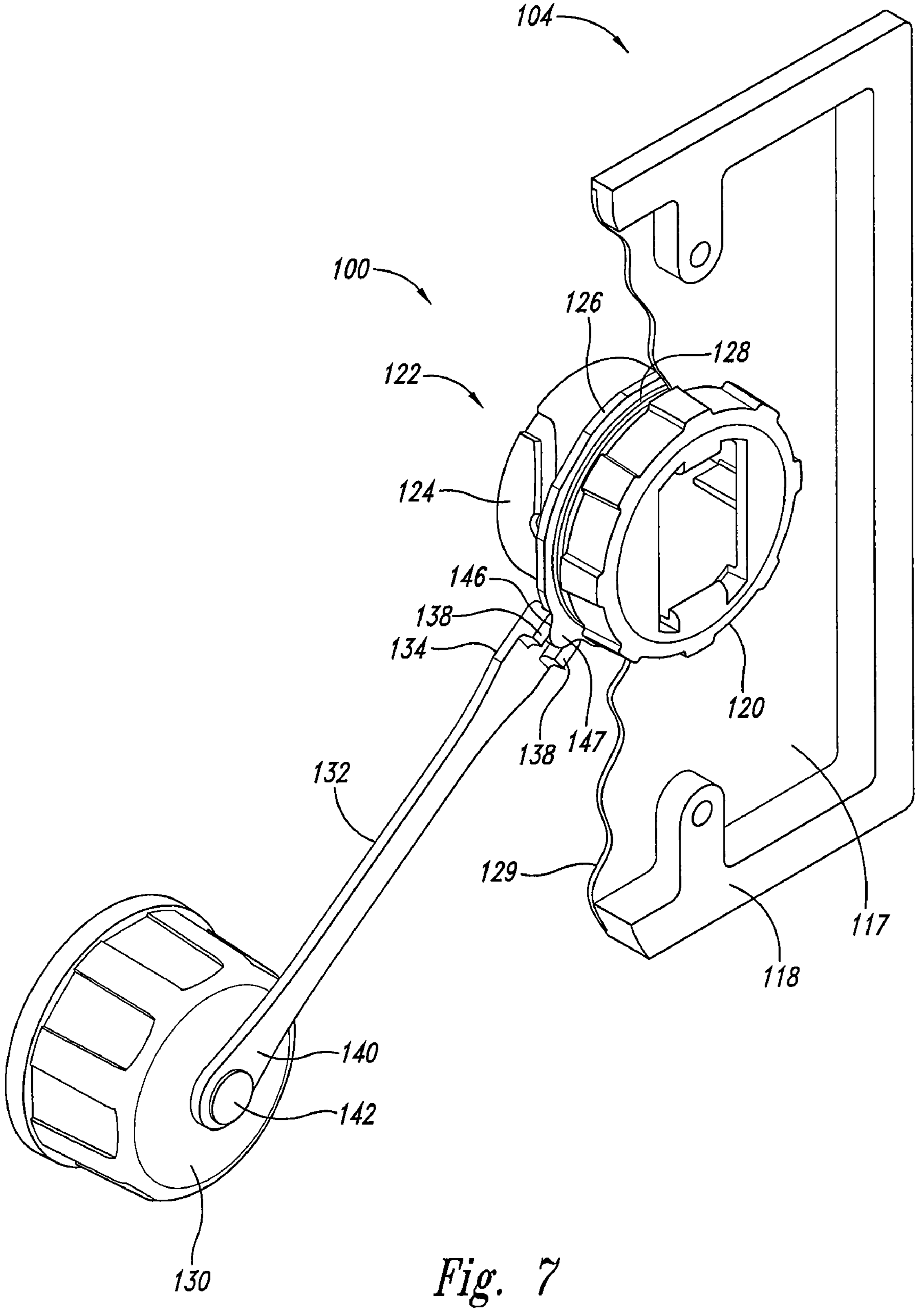
FIG. 7 is an isometric fragmentary rear view of the receptacle system of FIG. 1 with the receptacle cap uncoupled from the room side component.
Figure 8:
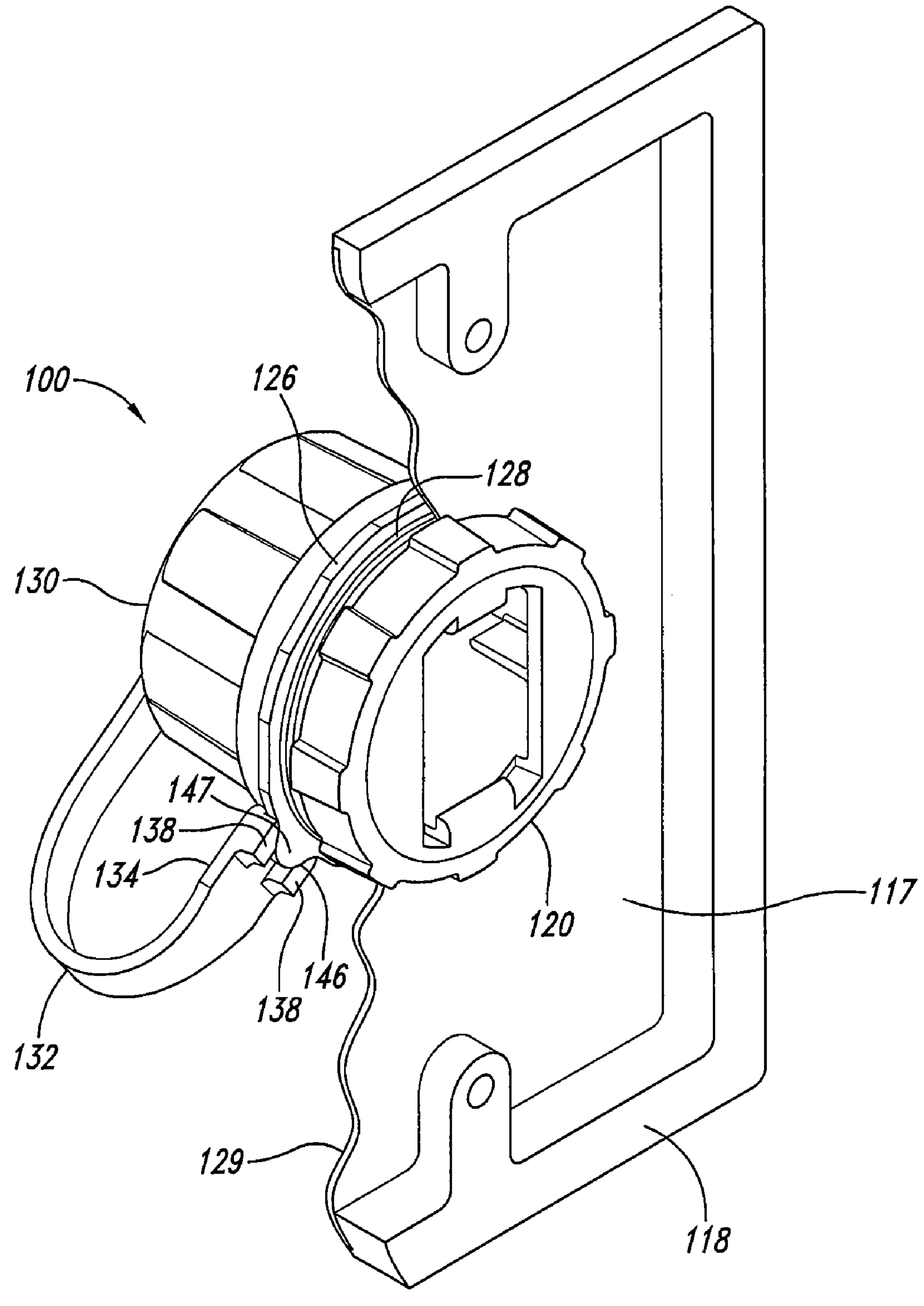
FIG. 8 shows the receptacle system of FIG. 7 with the receptacle cap coupled to the room side component.
Figure 9:
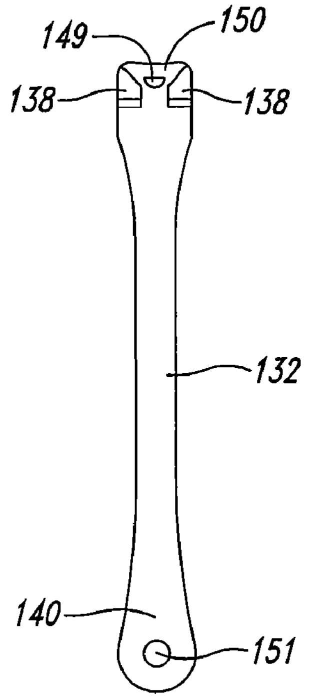
FIG. 9 is a rear view of the strap of FIG. 1.
Figure 10:
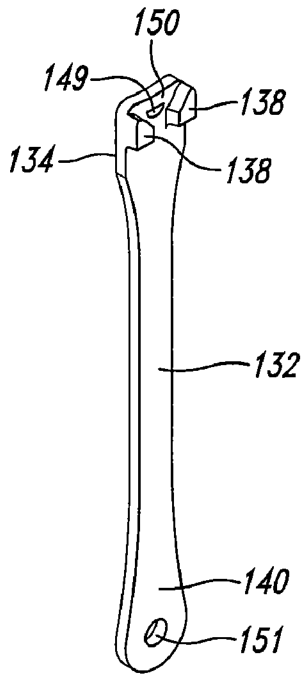
FIG. 10 is a first isometric rear view of the strap of FIG. 9.
Figure 11:
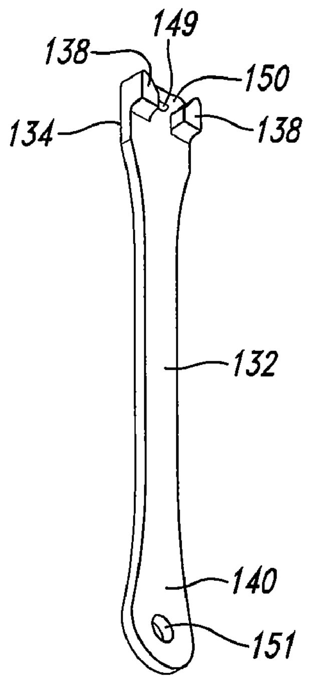
FIG. 11 is a second isometric rear view of the strap of FIG. 9.
Figure 12:
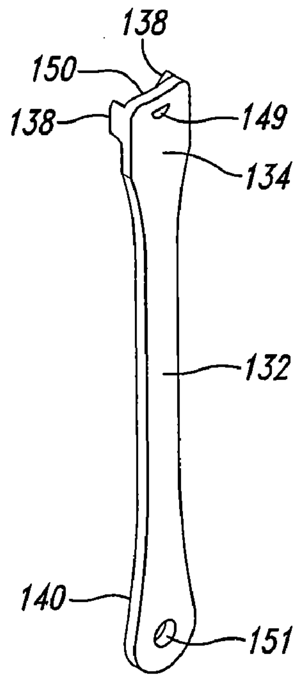
FIG. 12 is an isometric front view of the strap of FIG. 9.

The flange 126 on the room side of the receptacle 122 has an extended portion 146 with a first surface 147 as shown in FIGS. 4 and 5 that faces the wall plate 118 when the receptacle system 104 is assembled. The stud 136 projects from a second surface 148, shown in FIG. 4, of the extended portion 146 facing the room and opposite of the first surface 147. As shown in FIGS. 6-8, the two projections 138 of the strap 132 are spaced apart and project rearwardly toward the wall plate 118 to be positioned on opposite sides of the extended portion 146 of the flange 126 when the strap is coupled to the stud 136. The projections 138 serve as stops with the extended portion 146 trapped therebetween so that rotation and other undesirable movement of the strap about the stud is reduced or prevented. By reducing or preventing undesirable movement of the strap 132, it is less likely that the strap will interfere in some way with engagement of the cable cap 112 or the receptacle cap 130 with the receptacle 122 or otherwise somehow interfere by being improperly repositioned.

The elongate aperture 149 of the first end portion 134 of the strap 132 extends laterally, as shown in FIGS. 9-12, and as noted above, the stud 136 passes through the aperture when the strap is coupled to the receptacle 122. The stud 136 has a head portion large enough to trap the first end portion 134 of the strap 132 between the head portion and the extended portion 146 of the flange. The first end portion 134 has an end section 150, longitudinally outward of the aperture 149, having an amount of material that the stud 136 will tear, rip or otherwise sever when the strap is put under a sufficient tension without breaking the stud or other portions of the receptacle 122. The amount of material used for the end section 150 depends upon the type of material used. For instance, in some implementations types of thermoplastic rubber are used for the strap 132 whose characteristics will be a factor in determining the shape and size of the end section 150. The strap 132, since formed as a separate part from the gasket 128, may be made of a different material than the gasket.

The rounded aperture 151 of the second end portion 140 of the strap 132 is sized to allow free turning of the receptacle cap 130 relative to the strap to screw the cap onto and off of the engagement portion 124 to engage and disengage the cap with the receptacle 122. The stud 142 has a head portion large enough to trap the second end portion 140 of the strap 132 between the head portion and the cap 130.

Figure 13:
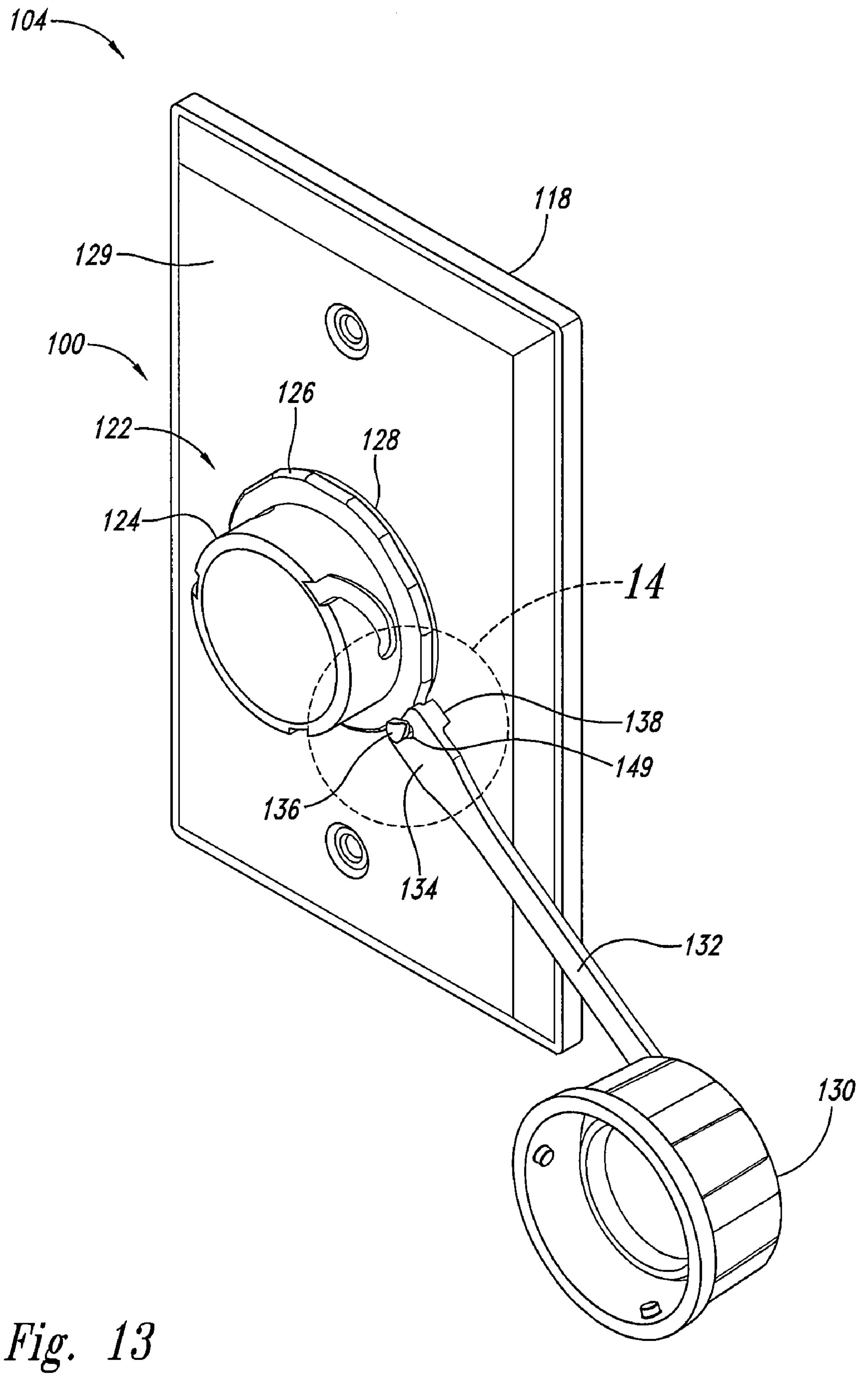
FIG. 13 is an isometric front view of the receptacle system of FIG. 1 with the receptacle cap uncoupled from the room side component.
Figure 14:
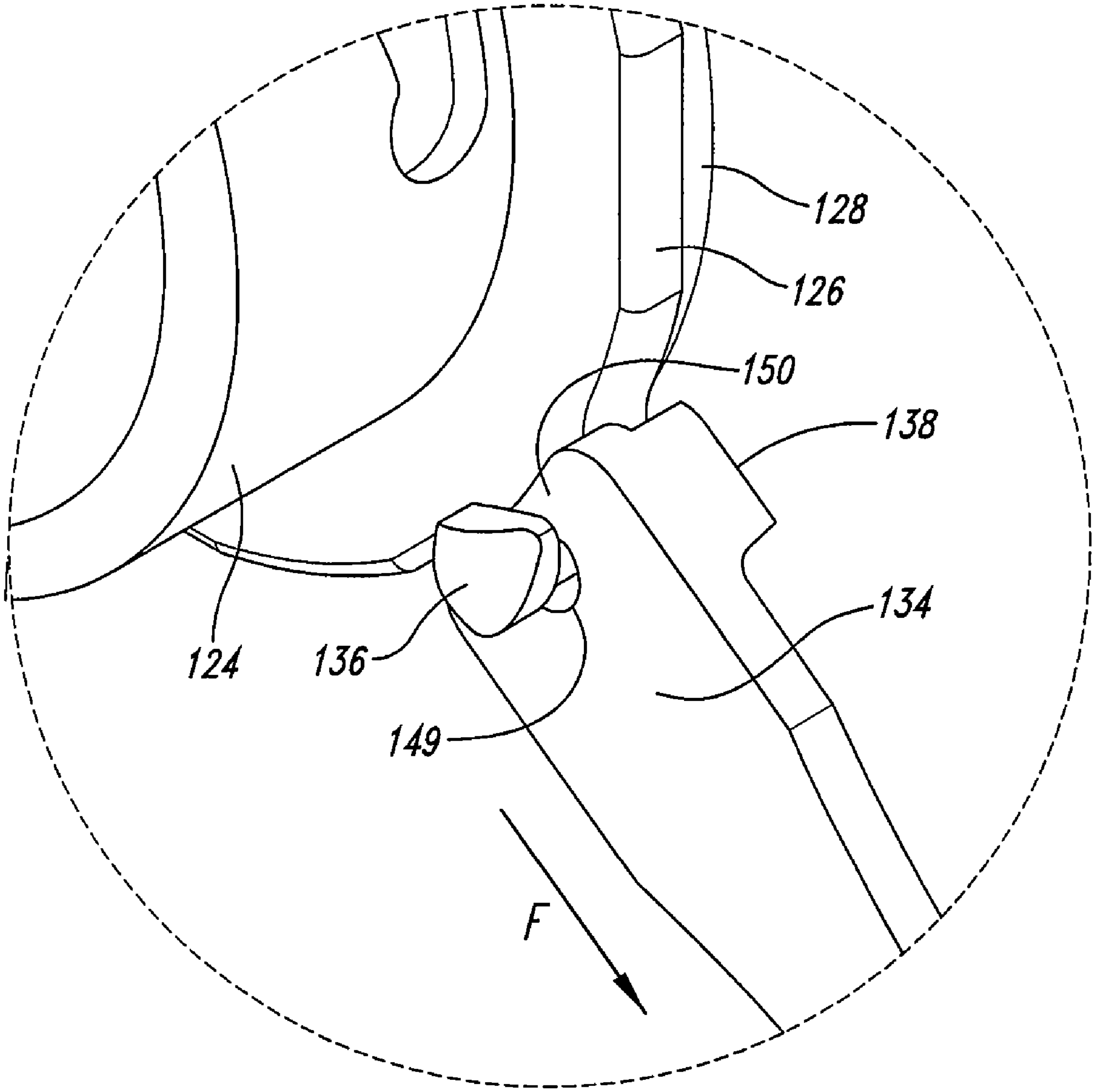
FIG. 14 is an enlarged isometric view of a portion of the receptacle system of FIG. 1 showing the strap under tension.
Figure 15:
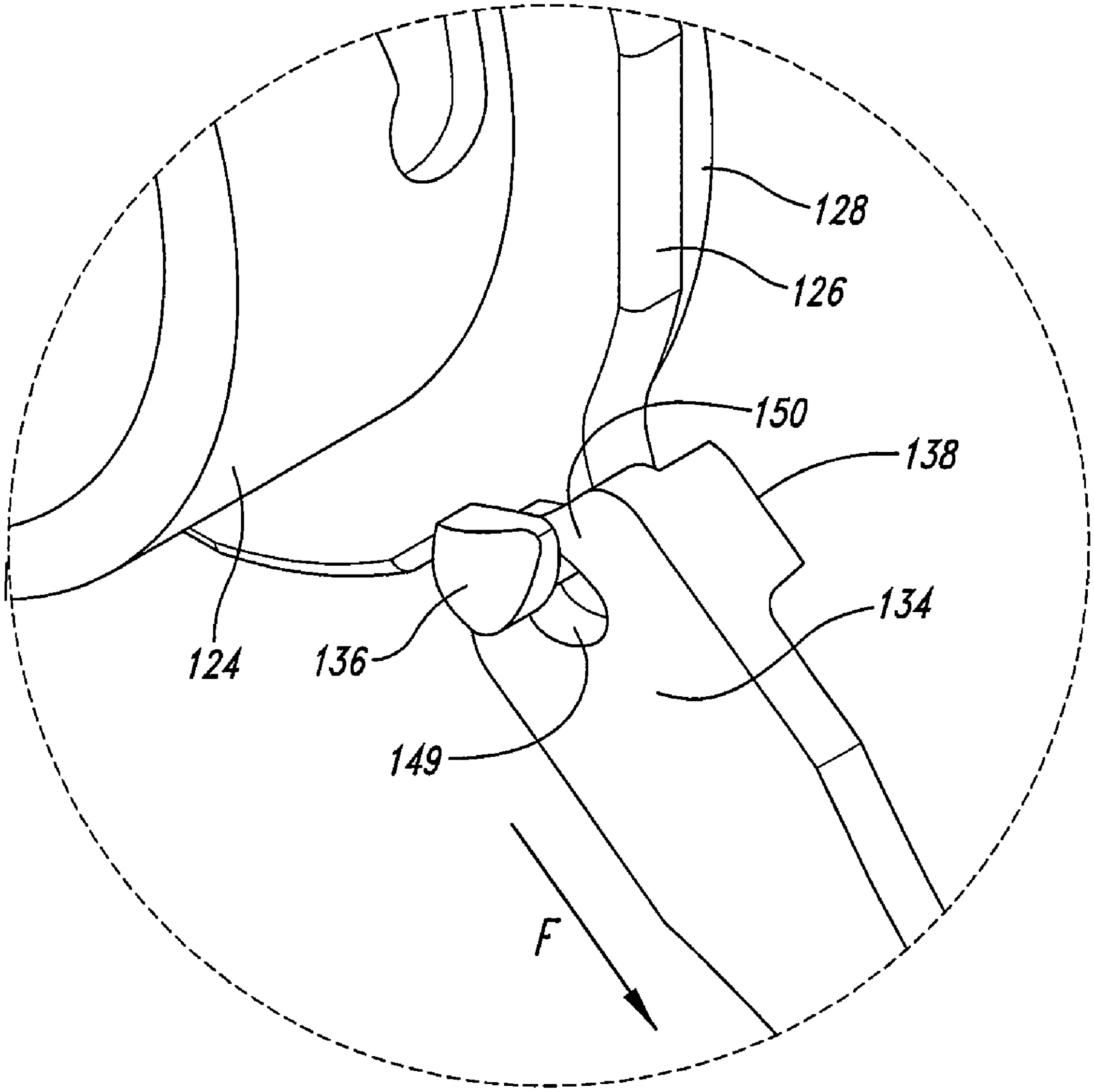
FIG. 15 is an enlarged isometric view of a portion of the receptacle system of FIG. 1 showing the strap under tension and starting to tear.
Figure 16:
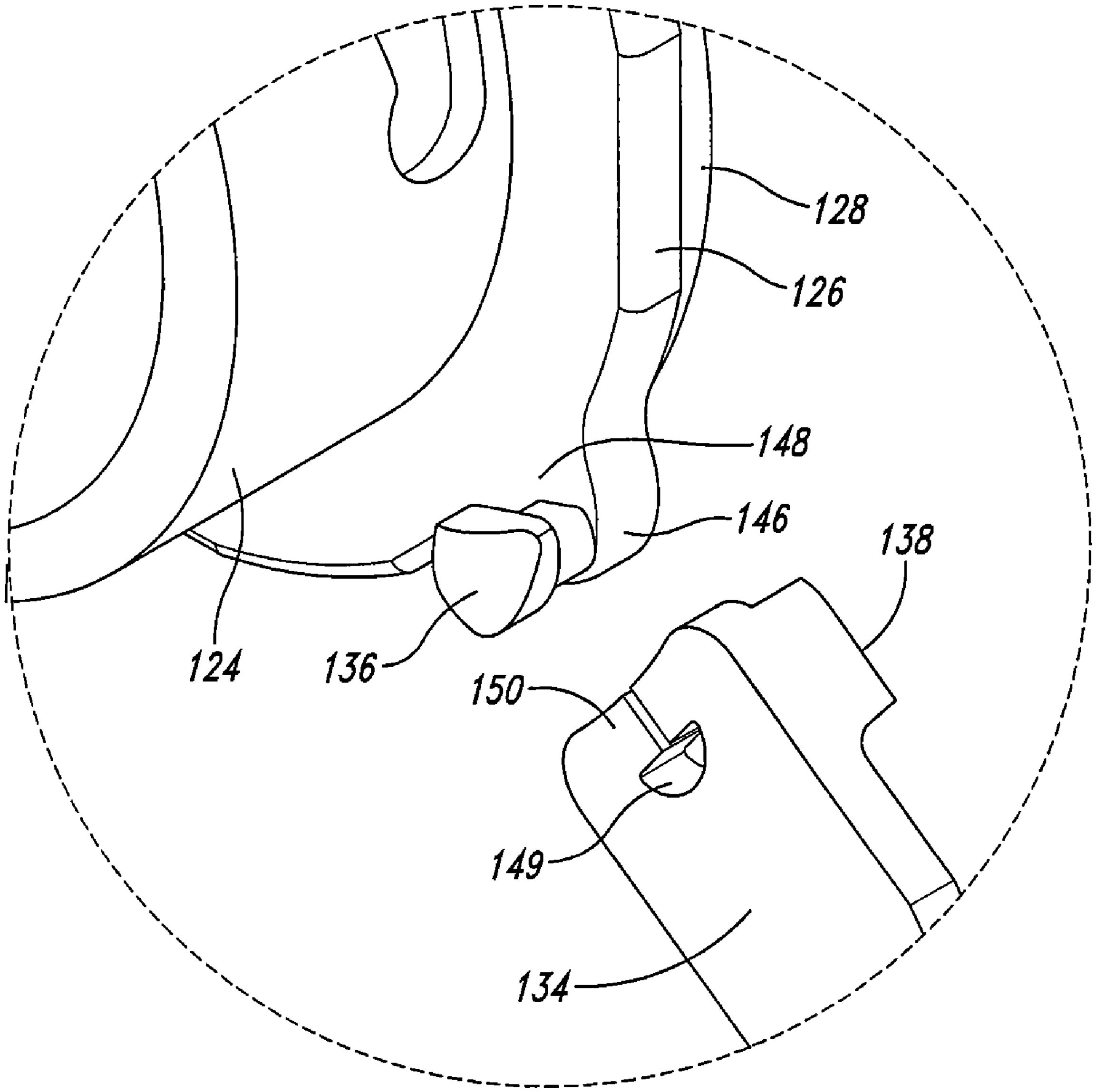
FIG. 16 is an enlarged isometric view of a portion of the receptacle system of FIG. 1 showing the strap completely torn from the room side component.

An area, shown in FIG. 13, where the strap 132 is coupled to the stud 136 is enlarged in FIG. 14 to show a force, F, pulling the strap laterally outward from the stud thereby enlarging the hole 149. As application of the force, F, continues, the hole 149 further enlarges and the end section 150 of the strap 132 begins to be torn or cut by the stud 136 as shown in FIG. 15. As the force, F, continues, the end section 150 of the strap 132 is fully torn as shown in FIG. 16. This separable engagement of the strap 132 with the receptacle 122 of the receptacle system 104 allows for the strap to experience high tension forces without damage being caused to the remainder of the receptacle system and without breaking the fluid tight seal the gasket 128 creates between the receptacle 122 and the wall plate 118, and thereby not allowing undesirable penetration of vapors, liquid and particulate matter within the room to leak past the receptacle. Since the gasket 128 is a separate part from the strap 132, a tension force on the strap does not lessen or endanger the integrity of the seal of the receptacle system 104 provided by the gasket.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. For a cable having an end with a plug and a first cap, a system comprising:

- a wall plate configured for mounting to a wall;
- a receptacle having an interior receptacle passage therethrough, the receptacle further including an engagement portion at least in part extending forward of the wall plate, the interior receptacle passage configured to receive the plug of the cable therewithin, the engagement portion being configured to removably receive the first cap, the receptacle having a first portion extending about the engagement portion;
- a jack positioned at least in part within the interior receptacle passage and coupled to the receptacle to engage the plug when received within the interior receptacle passage;
- a gasket sized and shaped to be located between a first portion of the receptacle and the wall plate to provide a fluid tight seal therebetween;
- a second cap configured to be removably coupled to the engagement portion; and
- a strap having a first end portion separably coupled to the receptacle and disconnected from the gasket, and a second end portion coupled to the second cap to permit rotation of the second cap relative to the strap.

2. The system of claim 1 wherein the receptacle includes an extending portion and the strap includes a pair of spaced apart stop members with the extending portion positioned therebetween such that the stop members engage the extending portion and retain the extending portion therebetween upon application of force to the strap tending to rotate the strap relative to the receptacle, thereby inhibiting rotation of the strap relative to the receptacle.

3. For a cable having an end with a plug and a first cap, a system comprising:

- a wall plate configured for mounting to a wall;
- a receptacle having an interior receptacle passage therethrough, the receptacle further including an engagement portion at least in part extending forward of the wall plate, the interior receptacle passage configured to receive the plug of the cable therewithin, the engagement portion being configured to removably receive the first cap, the receptacle having a first portion extending about the engagement portion;

a jack positioned at least in part within the interior receptacle passage and coupled to the receptacle to engage the plug when received within the interior receptacle passage;

a gasket sized and shaped to be located between a first portion of the receptacle and the wall plate to provide a fluid tight seal therebetween, the gasket made from a first material;

a second cap configured to be removably coupled to the engagement portion; and a strap having a first end portion separably coupled to the receptacle and disconnected from the gasket, and a second end portion coupled to the second cap to permit rotation of the second cap relative to the strap, the strap made from a second material different from the first material.

4. A system for use with a wall plate and a cable having a plug, comprising:

a receptacle having an interior receptacle passage therethrough the receptacle further including an engagement portion at least in part positionable to extend forward of the wall plate, the interior receptacle passage being configured to receive the plug of the cable therewithin, the receptacle further including an extending portion.

a gasket sized and shaped to be located between a portion of the receptacle and a wall plate to provide a fluid tight seal therebetween;

a cap configured to be removably coupled to the engagement portion; and a strap being a seperate piece from the gasket, the strap being configured to be coupled to the receptacle and coupled to the cap, the strap including a pair of spaced apart stop members with extending portion of the receptacle positioned therebetween such that the stop members engage the extending portion of the receptacle and retain the extending portion therebetween upon application of force to the strap tending to rotate the strap relative to the receptacle, thereby inhibiting rotation of the strap relative to the receptacle.

5. A system for use with a wall plate and a cable having a plug and a first cap; comprising:

a receptacle having an interior receptacle passage therethrough, the receptacle further including an engagement portion at least in part extending forward of the wall plate, the interior receptacle passage configured to receive an plug of the cable therewithin, the engagement portion being configured to removably receive the first cap, the receptacle including a projecting member;

a gasket sized and shaped to be located between the receptacle and the wall plate;

a second cap configured to be removably coupled to the engagement portion; and a strap having a first end portion toward a first end of the strap and disconnected from the gasket, the strap having an aperture in the first end portion sized to receive the projecting member therein to couple the strap to the receptacle, the aperture being spaced away from the first end of the strap to define an end section sized and made from a material such that the projecting member severs the end section upon a first tension being applied to the strap which is insufficient to break the projecting member, the strap having a second end portion coupled to the second cap.

6. A system for use with a wall plate configured for mounting to a wall, a cable having an end with a first connector and a first cap, and a second connector couplable to the first connector, a system comprising:

a receptacle having an interior receptacle passage, the receptacle further including an engagement portion at least in part extending forward of the wall plate when mounted to the wall plate, the interior receptacle passage configured to receive the first connector of the cable at least in part therewithin and the second connector at least in part therewithin, the engagement portion being configured to removably receive the first cap;

a gasket sized and shaped to be located between the receptacle and the wall plate when the receptacle is mounted to the wall plate to provide a fluid tight seal between the receptacle and the wall plate, the gasket made from a first material;

a second cap configured to be removably coupled to the engagement portion; and a strap having a first end portion coupled to the receptacle and disconnected from the gasket, and a second end portion coupled to the second cap, the strap made from a second material different from the first material.

7. The system of claim 6 wherein the receptacle includes an extending portion and the strap includes a pair of spaced apart stop members with the extending portion positioned therebetween such that the stop members engage the extending portion and retain the extending portion therebetween upon application of force to the strap tending to rotate the strap relative to the receptacle, thereby inhibiting rotation of the strap relative to the receptacle.

8. A system comprising:

a wall plate;

a receptacle mounted to the wall plate, the receptacle including a project member, a gasket located between the receptacle and the wall plate;

a cap removably couplable to the receptacle; and a strap coupled to the receptacle and disconnected from the gasket, and coupled to the cap, the strap having a first end portion toward a first end of the strap, the strap having and aperture in the first end portion sized to receive the projecting member therein to couple the strap to the receptacle, the aperture being spaced away from the first end of the strap to define an end section sized and made from a material such that the projecting member servers the end section upon a first tension being applied to the strap which is insufficient to break the projecting member, the strap having a second end portion coupled to the cap.

9. The system of claim 8 wherein the receptacle includes an extending portion and the strap includes a pair of spaced apart stop members with the extending portion positioned therebetween such that the stop members engage the extending portion and retain the extending portion therebetween upon application of force to the strap tending to rotate the strap relative to the projecting member of the receptacle, thereby inhibiting rotation of the strap relative to the receptacle.

10. The system of claim 9 wherein the receptacle includes a flange, the projecting member being attached the flange and extending forwardly therefrom, and the extending portion being attached to the flange and extending laterally therefrom.

11. A system for use with a wall plate, the system comprising:

a receptacle including an extending portion;

a gasket mounted on the receptacle for sealing with the wall plate;

a cap removably couplable to the receptacle; and a strap being a separate piece from the gasket, the strap coupled to the receptacle and to the cap, the strap including a pair of spaced apart stop members with the extending portion positioned therebetween such that the stop members engage the extending portion of the receptacle and retain the extending portion of the receptacle therebetween upon application of force to the strap tending to rotate the strap relative to the receptacle, thereby inhibiting rotation of the strap relative to the receptacle.

12. A system for use with a wall plate, comprising:

a receptacle having a flange and a stud projecting from the flange;

a gasket positioned on the receptacle adjacent the flange for sealing with the wall plate;

a cap removably couplable to the receptacle; and a strap having a first end portion disconnected from the gasket, the strap first end portion having an aperture sized to receive the stud therein to couple the strap to the receptacle, and a second end portion coupled to the cap.

13. The system of claim 12 wherein the first end portion of the strap terminates at a first end of the strap and the aperture is spaced away from the first end to define an end section between the aperture and the first end sized and made from a material such that the stud severs the end section upon a first tension being applied to the strap which is insufficient to break the stud.

14. The system of claim 12 wherein the stud projects forwardly from the flange, and the receptacle includes an extending portion attached to the flange and extending laterally therefrom, and wherein the first end portion of the strap includes a pair of spaced apart stop members with the extending portion positioned therebetween such that the stop members engage the extending portion and retain the extending portion therebetween upon application of force to the strap tending to rotate the strap on the stud, thereby inhibiting rotation of the strap relative to the receptacle.

* * * * *